United States Patent [19]

Otani et al.

[11] Patent Number: 4,535,746
[45] Date of Patent: Aug. 20, 1985

[54] INTAKE AIR HEATING DEVICE FOR INTERNAL COMBUSTION ENGINE FOR MOTORCYCLES

[75] Inventors: Junji Otani, Oomiya; Makoto Hirano, Asaka, both of Japan

[73] Assignee: Honda Giken Kogyo Kabushiki Kaisha, Tokyo, Japan

[21] Appl. No.: 683,338

[22] Filed: Dec. 19, 1984

Related U.S. Application Data

[63] Continuation of Ser. No. 394,690, Jul. 2, 1982, abandoned.

[30] Foreign Application Priority Data

Jul. 3, 1981 [JP] Japan ........................... 56-99308[U]

[51] Int. Cl.³ ............................................. F02M 31/00
[52] U.S. Cl. ..................................... 123/556; 180/227
[58] Field of Search ................ 123/552, 556; 180/226, 180/227, 228, 229

[56] References Cited

U.S. PATENT DOCUMENTS

| | | | |
|---|---|---|---|
| 2,289,635 | 7/1942 | Edelen | 123/552 |
| 3,513,817 | 5/1970 | Kearsley | 123/556 |
| 3,542,146 | 11/1970 | Hooper | 180/227 |
| 3,714,933 | 2/1973 | Ozaki | 123/556 |
| 3,754,612 | 8/1973 | Watanabe | 180/227 |
| 3,783,961 | 1/1974 | Hooper | 180/227 |
| 3,811,528 | 5/1974 | Hooper | 180/227 |
| 3,830,210 | 8/1974 | Muller | 123/552 |
| 4,050,430 | 9/1977 | Amagali | 123/556 |
| 4,249,500 | 2/1981 | Behrendt | 123/556 |
| 4,257,380 | 3/1981 | Bendig | 123/556 |

Primary Examiner—Ronald H. Lazarus
Attorney, Agent, or Firm—Armstrong, Nikaido, Marmelstein & Kubovcik

[57] ABSTRACT

An improved intake air heating device of internal combustion engine for motorcycles, having a compact and durable construction and adapted to heat the intake air to be fed to the engine by the heat derived from the exhaust gas. The device has an intake system leading to an intake port of the engine, an air cleaner connected to the intake system, an exhaust system connected to an exhaust port of the engine, an air heater disposed to surround a part of the exhaust system, and a heated air conduit providing a communication between the air cleaner and the air heater. The heated air conduit is arranged within the transverse breadth of the engine.

3 Claims, 5 Drawing Figures

INTAKE AIR HEATING DEVICE FOR INTERNAL COMBUSTION ENGINE FOR MOTORCYCLES

This application is a continuation of application Ser. No. 394,690, filed July 2, 1982 now abandoned.

BACKGROUND OF THE INVENTION

1. Field of the Invention

The present invention relates to an intake air heating device of internal combustion engine for motorcycles, adapted to heat the intake air fed to the engine by the heat derived from the exhaust gas to improve the startability of the engine.

2. Description of the Prior Art

In recent years, various types of such internal combustion engines have been proposed and put into practical use as being capable of operating with lean air-fuel mixture to cope with demands for cleaning of the exhaust emissions and reduction in fuel consumption. In the use of these engines, difficulty is often encountered inevitably concerning the starting up of the engine, particularly in the cold start-up of the engine in the districts where the air temperature is comparatively low. As a measure for overcoming the difficulty, it has been proposed to preheat the intake air to be fed to the engine by the heat derived from the exhaust gas to promote the atomization of the fuel in the intake mixture to improve the ignitability of the same.

This countermeasure, however, can hardly be taken in the case of the motorcycles because the intake air heating device cannot find the installation place. Namely, in the case of the internal combustion engines for motorcycles in which the engine and the associated parts are exposed to the open air and mounted in a limited space, it is essential that the intake air heating device can be mounted in a compact manner in a limited space without restricting the mounting conditions of other parts and/or making these parts difficult to access for maintenance. It is also necessary that the comparatively weak portion of the intake air heating device is suitably protected by a member having a high strength.

SUMMARY OF THE INVENTION

Accordingly, an object of the invention is to provide an intake air heating device of internal combustion engine for motorcycles, which is capable of eliminating the above-described problems of the prior art.

To this end, according to the invention, there is provided an intake air heating device of internal combustion engine for motorcycles adapted to heat the intake air by the heat derived from the exhaust gas, which comprises: an intake system leading to an intake port of the internal combustion engine; an air cleaner from which the intake system leads; an exhaust system connected to an exhaust port of the engine; an air heater disposed to surround a part of the exhaust system; and a heated air conduit providing a communication between the air cleaner and the air heater and arranged within the transverse breadth of the internal combustion engine.

The above and other objects, features and advantages of the invention will become clear from the following description of a preferred embodiment when the same is read in conjunction with the accompanying drawings.

DESCRIPTION OF THE PREFERRED EMBODIMENT

Figure 1:
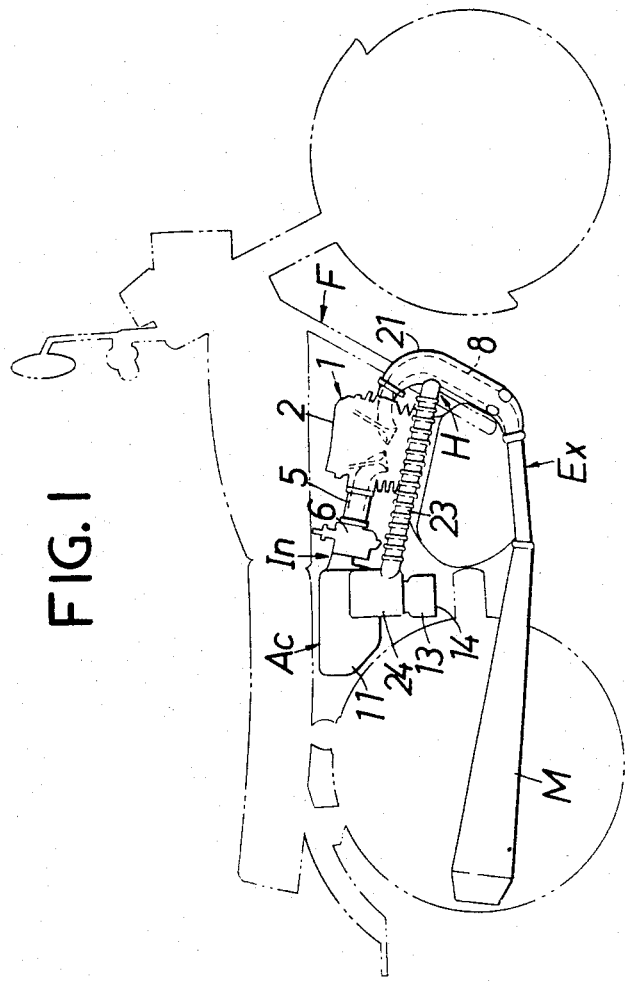
FIG. 1 is a schematic side elevational view of a motorcycle mounting an internal combustion engine equipped with an air heating device in accordance with the invention.
Figure 2:
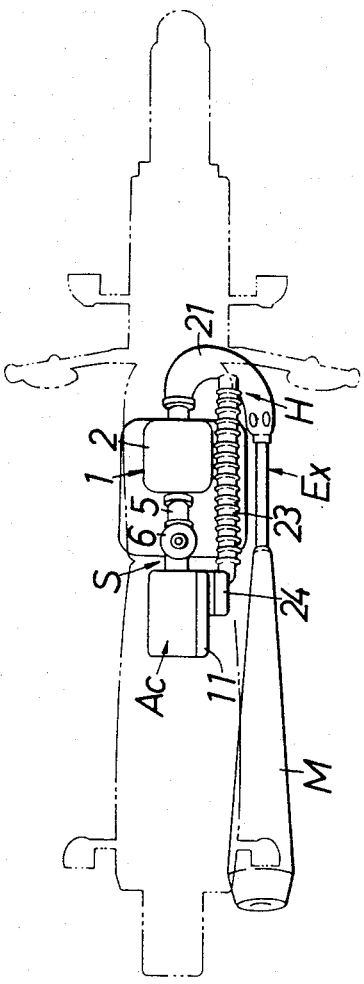
FIG. 2 is a plan view of the motorcycle shown in FIG. 1.
Figure 3:
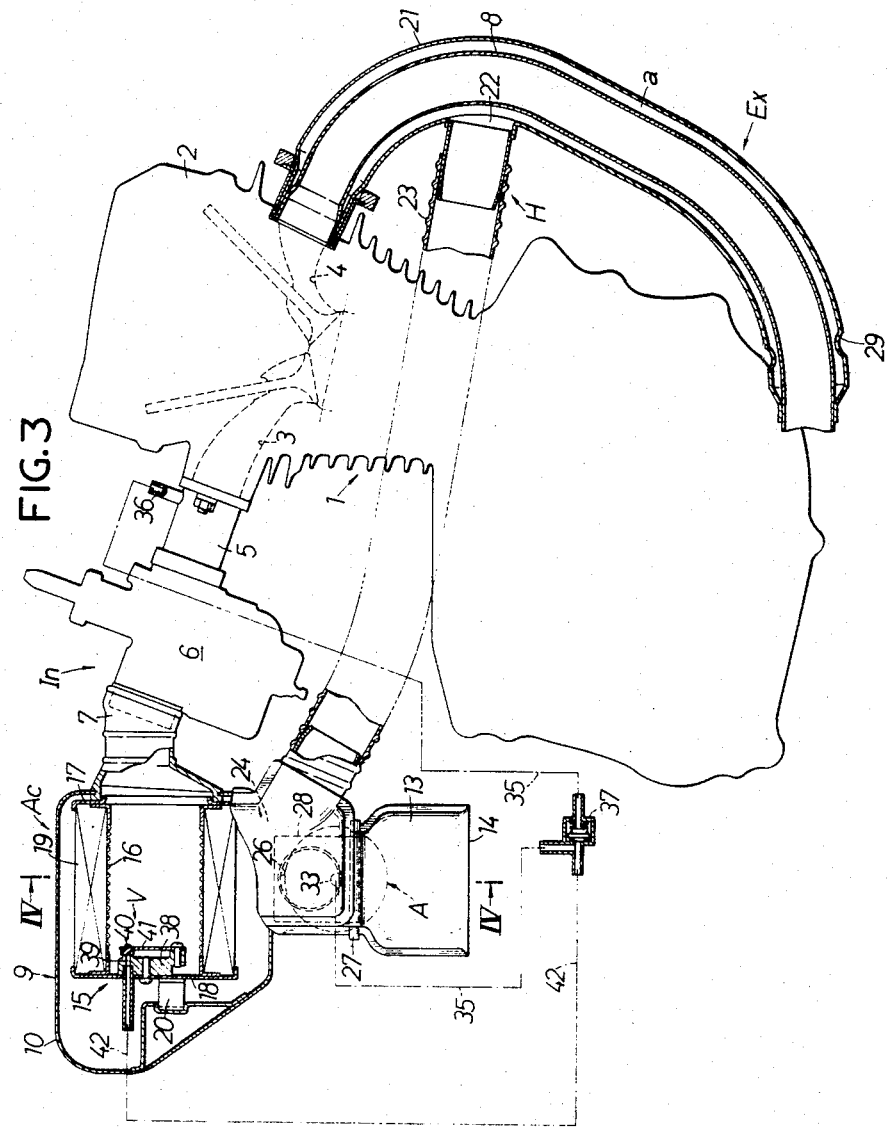
FIG. 3 is a sectional side elevational view of an essential part of the internal combustion engine.

A preferred embodiment of the invention will now be described mainly with reference to FIGS. 1 to 3. A motorcycle has a frame F carrying an internal combustion engine 1 having a cylinder head 2 provided with an intake port 3 and an exhaust port 4 which are in communication with a combustion chamber. An intake system In connected to the intake port 3 includes an intake pipe 5 connected to the open end surface of the intake port 3, a carburetor 6 connected to the outer end of the intake pipe 5 and an air cleaner Ac connected to the outer side of the carburetor 6 through a connecting tube 7 made of a flexible material such as rubber, plastic or the like. An exhaust system Ex connected to the exhaust port 4 has an exhaust pipe 8 connected to the open end of the exhaust port 4 and an exhaust muffler M connected to the outer end of the exhaust pipe 8.

Figure 4:
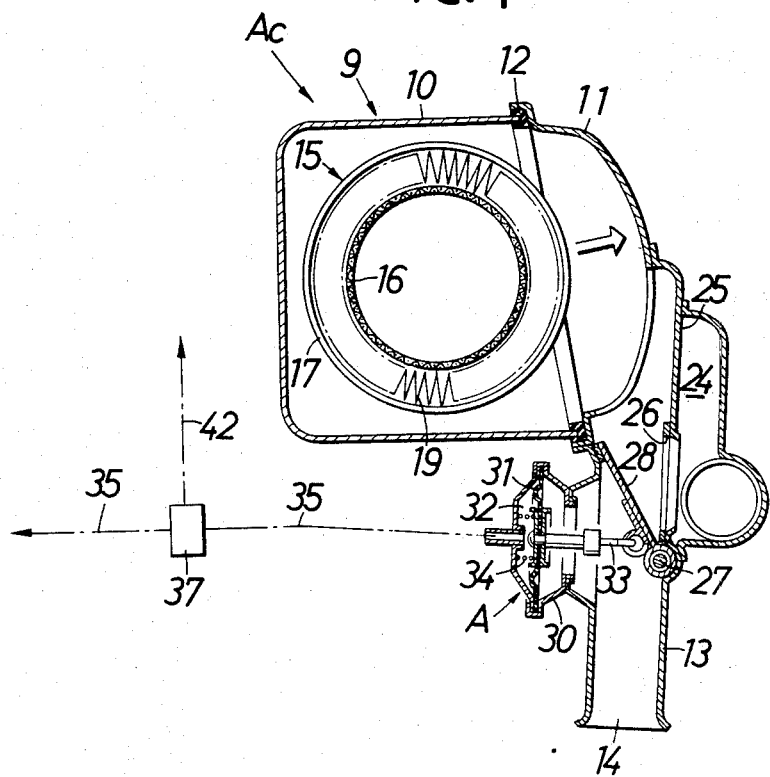
FIG. 4 is a sectional view taken along the line IV—IV of FIG. 3.
Figure 5:
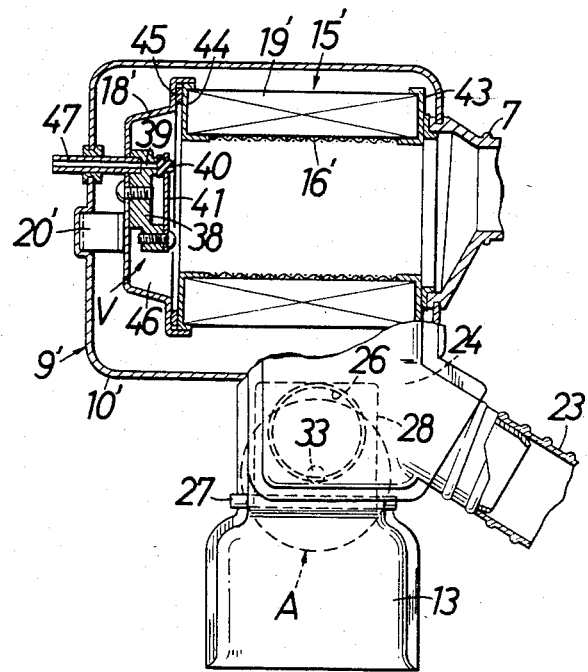
FIG. 5 is a sectional side elevational view of an essential part of the engine, showing particularly a modification of the air cleaner.

To explain in more detail the air cleaner Ac, the air cleaner Ac has a cleaner case 9 which is composed of a case body 10 capped with a case cover 11 through the medium of a seal member 12 as illustrated in FIG. 4. An air intake opening 13 is connected to one side portion of the case cover 11 and is extended downwardly to open at the lowermost end constituting an air intake opening 14. A cleaner unit 15 is extractably accommodated in the cleaner case 9 with an annular gap formed between the inner surface of the cleaner case 9 and the outer peripheral surface of the cleaner unit 15. The cleaner unit 15 is constituted by a hollow air-permeable cylinder 16 made of a porous plate, metal gauze wire or the like and provided with an outer peripheral flange integral therewith, the air-permeable cylinder 16 being opened at its both ends, an end plate 18 closing outer end opening of the air-permeable cylinder 16 and an air cleaner element 19 fitted around the air-permeable cylinder 16.

The cleaner unit 15 accommodated by the cleaner case 9 is resiliently clamped between the opened outer end surface of the aforementioned connecting tube 7 and a retainer leaf spring 20 attached to the inner surface of the case body 10 of the cleaner case 9. Therefore, the cleaner unit 15 can be detached by pulling the same in the direction perpendicular to the direction of axis thereof while compressing the retainer leaf spring 20, after detaching the case cover 11 from the case body 10.

As the engine is started, air is taken into the cleaner case 9 through the air intake opening 14 and is made to flow through the cleanr element 19 so as to be filtered by the latter, and the cleaned air is then introduced into the carburetor 6 through the air-permeable cylinder 16.

tracting the retainer leaf spring 20' while leaving the end plate 18' in the case body 10'.

As has been described, according to an aspect of the invention, the air cleaner Ac of the intake system In connected to the intake port 3 of the engine is communicated with an air heater 21 surrounding a part of the exhaust system Ex leading from the exhaust port 4, by means of the heated air conduit 23 which is arranged within the transverse breadth of the engine 1. Thus, the heated air conduit does never project laterally beyond both sides of the engine 1 and is protected by the engine 1 which has a high rigidity against any external damaging force. Thus, the heated air conduit is kept in good order and maintains a good appearance, while achieving its expected function to introduce the heated air to the air cleaner Ac with reduced flow resistance.

According to another aspect of the invention, the cleaner unit 15 (or 15') accommodated in the air cleaner case 9 (or 9') comprises a hollow air-permeable cylinder 16 (or 16') opened at its both ends, the air-permeable cylinder 16 (or 16') being communicated at its one end with the intake system S and closed at its one end by an end plate 18 (or 18'), and a cleaner element 19 (or 19') fitted around the air-permeable cylinder 16 (or 16'), the end plate 18 (or 18') being provided with a stop valve V with a temperature sensor adapted to selectively permit the introduction of air heated by the intake air heating device H into the air cleaner Ac. According to this arrangement, it is possible to mount the stop valve easily and in a compact manner in the air cleaner Ac making an efficient use of the end plate 18 (18') constituting a part of the cleaner element 15 (or 15'). The air introduced into the air cleaner Ac flows through the cleaner element 19 (or 19') and is smoothly fed into the intake system through the open end of the air-permeable cylinder 16 (or 16'). Thus, the stop valve V does not produce any resistance to the flow of intake air.

What is claimed is:

1. In an internal combustion engine for a motorcycle wherein the engine is mounted on a motorcycle frame, the engine having an intake port and an exhaust port opening at its rear and front sides respectively, in the traveling direction of the motorcycle, the engine also having an air cleaner connected to a carburetor, which is in turn connected to said intake port, and the exhaust port is connected to an exhaust pipe leading to an exhaust muffler which is positioned rearward of the frame, said exhaust pipe having a part which extends downwardly in front of the engine and then along the side of the engine, an intake air heater, comprising:

an air heater means for heating air before entering the intake port, said air heater means having an air heating chamber, disposed around at least part of said exhaust pipe, for heating intake air taken from the external atmosphere through an opening which is provided in the air heater means; and a heated air conduit extending in the longitudinal direction of the motorcycle and passing to the side of the engine cylinder within the transverse breadth of the engine for connection at one end thereof to the air heating chamber at a portion thereof located within the transverse breadth of the engine and at the other end to one side of the air cleaner.

2. An intake air heating device according to claim 1, wherein said air cleaner comprises a cleaner case having an air intake opening, and a cleaner unit accommodated in said cleaner case with a clearance formed therebetween, said cleaner unit comprising a hollow air-permeable cylinder opened at its opposite ends, one end of said cylinder being in communication with said intake port while the other end being closed by an end plate, a cleaner element fitted around said air-permeable cylinder, and a stop valve equipped with a temperature sensor and adapted to control the introduction and shut-off of the air heated by said intake air heater into said air cleaner.

3. An intake air heating device according to claim 2, wherein said air cleaner comprises an air intake pipe connected to said cleaner case, a change-over valve selectively communicating said air intake pipe with the inside of said cleaner case, and a vacuum-operated actuator for actuating said change-over valve, said actuator having a vacuum working chamber in communication with the intake port through a check valve to transmit the intake vacuum generated by said engine to said vacuum working chamber thereby to actuate said change-over valve to selectively place said heated conduit in communication with the inside of said air cleaner, said vacuum working chamber being in communication with the inside of said cleaner case through said stop valve so that when the temperature of air heated by said air heater exceeds a predetermined value, said stop valve is opened to permit air in said cleaner case to be introduced into said vacuum working chamber whereby said change-over valve is operated to selectively bring said air intake pipe into communication with said cleaner case.

* * * * *